United States Patent [19]

Cummins

[11] 3,938,005

[45] Feb. 10, 1976

[54] ELECTRICAL GENERATING SYSTEM OVERVOLTAGE PROTECTION CIRCUIT

[75] Inventor: Donald L. Cummins, Anderson, Ind.

[73] Assignee: General Motors Corporation, Detroit, Mich.

[22] Filed: Nov. 25, 1974

[21] Appl. No.: 526,538

[52] U.S. Cl. .................... 317/13 R; 322/28; 317/31
[51] Int. Cl.² ........................................ H02H 3/20
[58] Field of Search ............. 317/13 R, 31; 322/28; 320/64

[56] References Cited
UNITED STATES PATENTS

| | | | |
|---|---|---|---|
| 3,350,627 | 10/1967 | Wright | 317/31 |
| 3,723,817 | 3/1973 | Leonard et al. | 317/31 |
| 3,737,725 | 6/1973 | Donnelly | 317/31 |
| 3,789,269 | 1/1974 | Holm et al. | 317/31 |
| 3,835,367 | 9/1974 | Wiley | 317/31 |

*Primary Examiner*—J. D. Miller
*Assistant Examiner*—Harry E. Moose, Jr.
*Attorney, Agent, or Firm*—Richard G. Stahr

[57] ABSTRACT

The fuse element of a thermal fuse and heater assembly is connected in series in the energizing circuit of the generator field winding of an electrical generating system between the field winding and the current carrying elements of an associated voltage regulator output switch. System potential is applied across circuitry responsive to system overvoltage conditions for completing an energizing circuit for the heater element of the thermal fuse and heater assembly. With sustained system overvoltage conditions, the heater element heats the thermal fuse element to a temperature at which the fuse element "burns out" to interrupt the generator field winding energizing circuit.

5 Claims, 1 Drawing Figure

U.S. Patent   Feb. 10, 1976   3,938,005
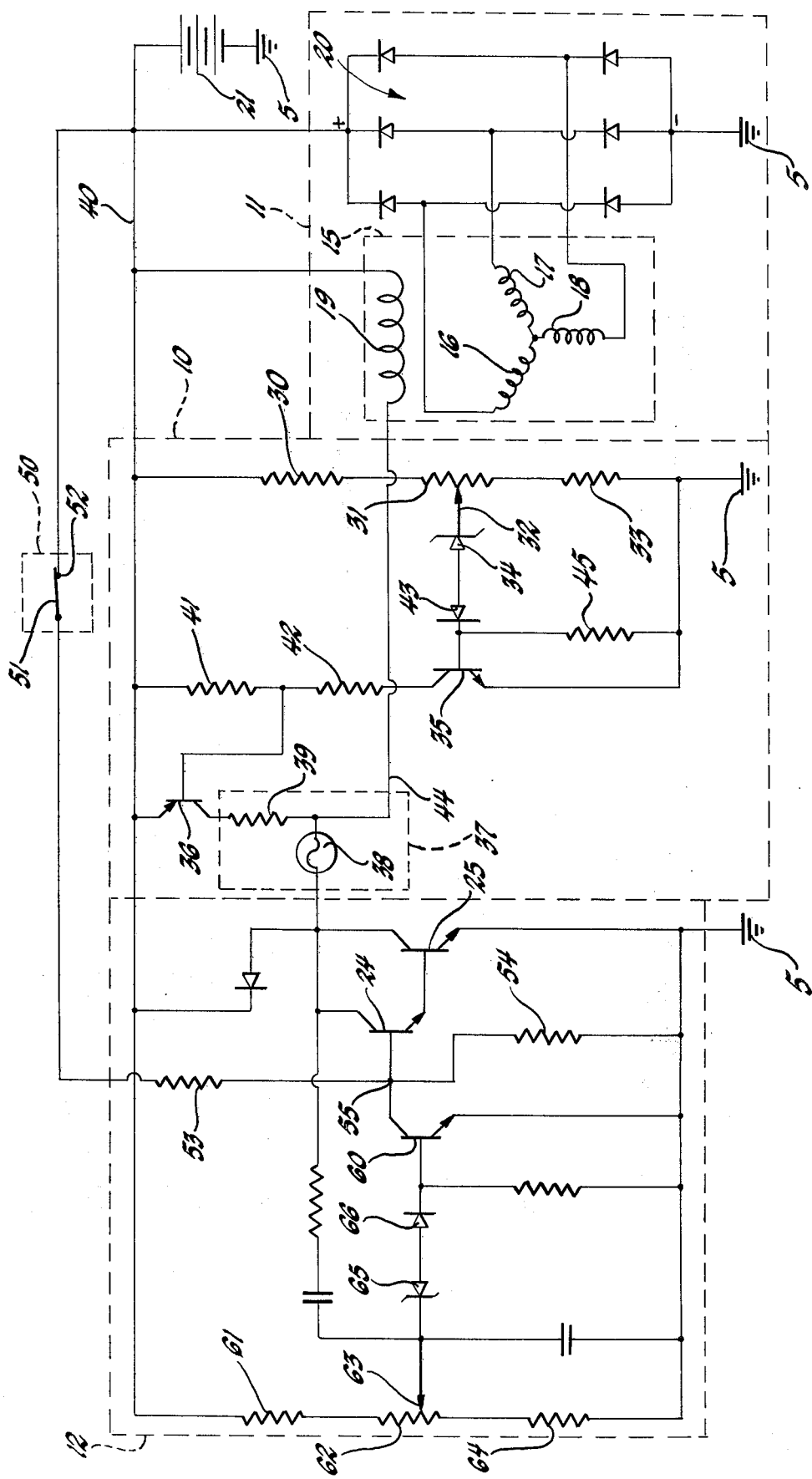

ELECTRICAL GENERATING SYSTEM OVERVOLTAGE PROTECTION CIRCUIT

This invention relates to an electrical generating system overvoltage protection circuit, and, more specifically, to a circuit of this type which provides for overvoltage protection of an electrical generating system with sustained overvoltage conditions.

In accordance with this invention, an electrical generating system overvoltage protection circuit is provided wherein the fuse element of a thermal fuse and heater assembly is connected in series in the protected generating system generator field winding energizing circuit and system potential is applied across circuitry responsive to system overvoltage conditions for completing an energizing circuit for the heater element of the thermal fuse and heater assembly whereby, with sustained overvoltage conditions, the generator field winding energizing circuit is interrupted by the thermal fuse element of the thermal fuse and heater assembly.

For a better understanding of the present invention, together with additional objects, advantages and features thereof, reference is made to the following description and accompanying single FIGURE drawing wherein the electrical generating system overvoltage protection circuit of this invention is set forth in schematic form in combination with an electrical generating system and an associated voltage regulator circuit.

As point of reference or ground potential is the same point electrically throughout the system, it has been illustrated in the drawing by the accepted schematic symbol and is referenced by the numeral 5.

Referring to the drawing, the electrical generating system overvoltage protection circuit of this invention is set forth in schematic form within dashed line rectangle 10 in combination with an electrical generating system 11 and an associated voltage regulator circuit 12.

One example, and without intention or inference of a limitation thereto, of an electrical generating system with which the overvoltage protection circuit of this invention may be used is set forth schematically within dashed line rectangle 11. The generating system so illustrated includes a three-phase alternator 15 having three output windings 16, 17 and 18 and a field winding 19 and, to provide for full-wave rectification of the generator 15 output potential, a full-wave diode bridge type rectifier circuit 20 having positive and negative polarity output terminals. The electrical generating system may be employed to charge a conventional storage type battery 21 or to supply direct current operating potential to any other direct current electrical load. Although the electrical generating system has been illustrated in the drawing to be of the three-phase alternator-full-wave diode bridge rectifier type, it is to be specifically understood that the overvoltage protection circuit of this invention may be employed with other electrical generating system types without departing from the spirit of the invention.

Any voltage regulator circuit of the type including an output switching device having the current carrying elements thereof connected in series with the generator field winding across a source of DC operating potential may be employed in combination with an electrical generating system and the overvoltage protection circuit of this invention. One example, and without intention or inference of a limitation thereto, of a suitable voltage regulator circuit is set forth in schematic form within dashed line rectangle 12 and is illustrated as having an NPN transistor Darlington pair 24 and 25 output switch. The schematic circuitry of voltage regulator circuit 12 is set forth in the FIGURE only for the purpose of illustrating a complete, workable combination with which the overvoltage protection circuit of this invention may be employed. It is to be specifically understood that other voltage regulator circuits may be employed without departing from the spirit of the invention. The operation of the illustrated voltage regulator circuit will be described briefly later in this specification.

The overvoltage protection circuit of this invention is set forth schematically within dashed line rectangle 10 and includes a voltage divider network comprised of the series combination of resistor 30, potentiometer 31 having a movable contact 32 and resistor 33; Zener diode 34; NPN transistor 35; PNP transistor 36 and thermal fuse and heater assembly 37 having a thermally sensitive fuse element 38 and an electrically energizable heater element 39 in heat transfer relationship with thermally sensitive fuse element 38. Thermal fuse and heater assembly 37 is a commercially available item which is manufactured and marketed by Micro Devices of Dayton, Ohio under the designation SK-856 (type 3V53001). It is to be specifically understood, however, that a thermal fuse and heater assembly package is not absolutely necessary to the invention as a separate thermally sensitive fuse element and a separate electrically energizable heater element in heat transfer relationship with the fuse element may be employed. Generating system voltage is impressed across positive polarity potential lead 40, connected to the positive polarity output terminal of both rectifier circuit 20 and battery 21, and point of reference or ground potential 5, connected to the negative polarity output terminal of both rectifier circuit 20 and battery 21. Consequently, generating system voltage is supplied across the voltage divider network; across series collector resistors 41 and 42 and the collector-emitter electrodes of NPN transistor 35 in the proper polarity relationship to produce collector-emitter conduction through an NPN transistor; and across the emitter-base electrodes of PNP transistor 36, connected in series with collector resistor 42 and the collector-emitter electrodes of transistor 35, in the proper polarity relationship to produce emitter-base current flow through a PNP transistor. Zener diode 34 is connected in an inverse polarity relationship across movable contact 32 of potentiometer 31 and the base electrode of NPN transistor 35 through a temperature compensating diode 43. The base electrode of NPN transistor 35 is connected to point of reference or ground potential 5 through resistor 45. Fuse element 38 of the thermal fuse and heater assembly 37 is connected in series in the energizing circuit of field winding 19 of generator 15 which may be traced from the positive polarity output terminal of both rectifier circuit 20 and battery 21, through positive polarity potential lead 40, field winding 19, lead 44, fuse element 38, the collector-emitter electrodes of the NPN transistor Darlington pair 24 and 25 of voltage regulator circuit 12 and point of reference or ground potential 5 to the negative polarity output terminal of both rectifier circuit 20 and battery 21. Generating system voltage, therefore, is applied across the generator field winding 19 energizing circuit and is also applied across the emitter-collector electrodes of PNP transistor 36, connected in series with heater element 39 and fuse element 38 and the collector-emitter electrodes of NPN transistor Darlington pair 24 and 25, in the proper polarity relationship to produce emittercollector conduction through a PNP transistor through positive polarity potential lead 40 and point of reference or ground potential 5.

Generating system voltage is the most convenient direct current voltage to be applied across series collector resistors 41 and 42 and the collector-emitter electrodes of transistor 35; across the emitter-base electrodes of transistor 36 and across the series combination of the emitter-collector electrodes of transistor 36, heater element 39, fuse element 38 and transistor Darlington pair 24 and 25, however, a separate source or sources of direct current voltage may be so employed if desired.

While movable contact 51 of electrical switch 50 is operated into electrical contact with stationary contact 52, as illustrated in the drawing, generating system voltage is applied across series resistors 53 and 54. These resistors are so proportioned that the potential upon junction 55 is of a positive polarity with respect to point of reference or ground potential 5 and of a sufficient magnitude to produce base-emitter drive current through NPN transistor Darlington pair 24 and 25, consequently, these devices are conductive to complete the field winding 19 energizing circuit previously described. Generating system voltage is applied across the voltage divider network including resistor 61, potentiometer 62 having a movable contact 63 and resistor 64 through positive polarity potential lead 40 and point of reference or ground potential 5. In a practical application of the overvoltage protection circuit of this invention, a Zener diode having a rated inverse breakdown potential of 8.0 volts was selected as the Zener diode corresponding to Zener diode 65 and movable contact 63 of potentiometer 62 was adjusted to the point at which, with the preselected generating system output voltage level magnitude of 27.5 volts present across the voltage divider network, the potential across movable contact 63 and point of reference or ground potential 5 was of a magnitude equal to the actual inverse breakdown potential of the Zener diode selected for Zener diode 65 and of a positive polarity upon movable contact 63 with respect to point of reference or ground potential 5. While the generating system output voltage level is equal to or less than the preselected magnitude, the energizing circuit for field winding 19 of generator 15 is completed through the energizing circuit previously described. Should the system output voltage level rise above the preselected magnitude to a level at which the potential appearing across movable contact 63 and point of reference or ground potential 5 is equal to the inverse breakdown potential of Zener diode 65, this device breaks down and conducts in the reverse direction. While Zener diode 65 conducts in the reverse direction, baseemitter drive current is supplied to NPN transistor 60 through Zener diode 65 and temperature compensating diode 66. As the generating system voltage is applied through positive polarity potential lead 40 and point of reference or ground potential 5 across the collector-emitter electrodes of NPN transistor 60 in the proper polarity relationship to produce collector-emitter conduction therethrough, this base drive current triggers NPN transistor 60 conductive. While transistor 60 conducts, junction 55 is at substantially ground potential, a condition which extinguishes the NPN transistor Darlington pair 24 and 25 to interrupt the generator 15 field winding 19 energizing circuit. Upon the interruption of the energizing circuit for field winding 19, generating system voltage begins to fall until it reaches a level at which the potential appearing across movable contact 63 of potentiometer 62 and point of reference or ground potential 5 is less than the inverse breakdown potential of Zener diode 65. At this time, Zener diode 65 ceases to conduct to interrupt the circuit through which base-emitter drive current is supplied to NPN transistor 60. Upon the interruption of this base-emitter drive current supply circuit, NPN transistor 60 extinguishes and the potential upon junction 55 rises to a level at which baseemitter drive current is supplied to the NPN transistor Darlington pair 24 and 25 to trigger these devices conductive through the collector-emitter electrodes to complete the energizing circuit for field winding 19 of generator 15. From this description, it is apparent that voltage regulator circuit 12 operates the current carrying elements of the output switching device to the electrical circuit open and closed conditions in response to system overvoltage and normal voltage conditions, respectively.

In the event of a regulator circuit fault of the type which would result in the failure of the regulator circuit to operate the current carrying elements of the output switch to the electrical circuit open condition with generating system over-voltage conditions, the voltage regulator circuit would be ineffective to interrupt the energizing circuit for field winding 19 of generator 15 with overvoltage conditions. Consequently, without the overvoltage protection circuit of this invention, the generating system output voltage would rise to intolerably high levels. In a practical application of the overvoltage protection circuit of this invention, a Zener diode having a rated inverse breakdown potential of 8.0 volts was selected as the Zener diode corresponding to Zener diode 34 and movable contact 32 of potentiometer 31 was adjusted to the point at which, with a generating system output voltage level magnitude of 30.8 volts present across resistor 30, potentiometer 31 and resistor 33, the potential across movable contact 32 and point of reference or ground potential 5 was of a magnitude equal to the actual inverse breakdown potential of the Zener diode selected for Zener diode 34 and of a positive polarity upon movable contact 32 with respect to point of reference or ground potential 5. In the event of voltage regulator failure, when the generating system output voltage level rises to 30.8 volts, Zener diode 34 breaks down and conducts in a reverse direction to supply base-emitter drive current to NPN transistor 35 through temperature compensating diode 43. As generating system voltage is applied across the collector-emitter electrodes of NPN transistor 35 in the proper polarity relationship to produce collector-emitter current through an NPN transistor, this base drive current triggers NPN transistor 35 conductive through the collector-emitter electrodes. With NPN transistor 35 conducting through the collector-emitter electrodes, a circuit is established through which emitter-base drive current is supplied to PNP transistor 36, which may be traced from positive polarity potential lead 40, through the emitter-base electrodes of PNP transistor 36, resistor 42 and the collectoremitter electrodes of transistor 35 to point of reference or ground potential 5. As generating system voltage is applied across the emitter-collector electrodes of transistor 36 in the proper polarity relationship to produce emitter-collector conduction through a PNP transistor, this device conducts through the emitter-collector electrodes to establish a circuit through which energizing current is supplied to heater element 39 which may be traced from positive polarity potential lead 40, through the emitter-collector electrodes of transistor 36, heater element 39 and fuse element 38 of thermal heater and fuse assembly 37 and the collector-emitter electrodes of transistor Darlington pair 24 and 25 to point of reference or ground potential 5. The flow of energizing current through heater element 39 supplies heat to fuse element 38 and, with sustained overvoltage conditions, heats fuse element 38 to the point at which it opens to interrupt the generator field winding 19 energizing circuit previously described. Upon the interruption of the field winding 19 energizing circuit, the system output voltage drops to zero. In this manner, the circuit of this invention provides overvoltage protection for the electrical generating system.

In the drawing, a self-excited electrical generating system is schematically set forth. It is to be specifically understood that the overvoltage protection circuit of this invention is equally applicable to electrical generating systems having separately excited generator field windings.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An electrical generating system overvoltage protection circuit comprising in combination with an electrical generating system including an electrical generator having a field coil connected in series with the current carrying elements of a field coil energizing circuit electrical switching device across a source of energizing voltage and a voltage regulator circuit which operates the current carrying elements of the electrical switching device to the electrical circuit closed and open conditions in response to generator output voltage below and above a predetermined level, respectively: a thermally sensitive fuse element connected in series with said generator field coil and said current carrying elements of said field coil energizing circuit electrical switching device; an electrically energizable heater element in heat transfer relationship with said thermally sensitive fuse element; a voltage divider network including a potentiometer having a movable contact; means for applying the generating system output voltage across said voltage divider network; and NPN transistor having base, collector and emitter electrodes; a Zener diode; means for connecting said Zener diode in an inverse polarity relationship across said base electrode of said NPN transistor and said movable contact of said potentiometer; a PNP transistor having base, collector and emitter electrodes; means for connecting said emitter-base electrodes of said PNP transistor in series with said collector-emitter electrodes of said NPN transistor; means for applying the generating system output voltage across said collector-emitter electrodes of said NPN transistor and the series combination of said emitter-base electrodes of said PNP transistor and said collector-emitter electrodes of said NPN transistor; and means for applying the generating system output voltage across the series combination of said emitter-collector electrodes of said PNP transistor, said heater element, said thermally sensitive fuse element and said current carrying elements of said field coil energizing circuit electrical switching device.

2. An electrical generating system overvoltage protection circuit comprising in combination with an electrical generating system including an electrical generator having a field coil connected in series with the current carrying elements of a field coil energizing circuit electrical switching device across a source of energizing voltage and a voltage regulator circuit which operates the current carrying elements of the electrical switching device to the electrical circuit closed and open conditions in response to generator output voltage below and above a predetermined level, respectively; a thermally sensitive fuse element connected in series with said generator field coil and said current carrying elements of said field coil energizing circuit electrical switching device; an electrically energizable heater element in heat transfer relationship with said thermally sensitive fuse element; a voltage divider network including a potentiometer having a movable contact; means for applying the generating system output voltage across said voltage divider network; an NPN transistor having base, collector and emitter electrodes; a Zener diode; means for connecting said Zener diode in an inverse polarity relationship across said base electrode of said NPN transistor and said movable contact of said potentiometer; a PNP transistor having base, collector and emitter electrodes; means for connecting said emitter-base electrodes of said PNP transistor in series with said collector-emitter electrodes of said NPN transistor; means for connecting said collector-emitter electrodes of said NPN transistor and the series combination of said emitter-base electrodes of said PNP transistor and said collector-emitter electrodes of said NPN transistor across a source of direct current voltage; and means for connecting said emitter-collector electrodes of said PNP transistor, said heater element, said thermally sensitive fuse element and said current carrying elements of said field coil energizing circuit electrical switching device in series across a source of direct current voltage.

3. An electrical generating system overvoltage protection circuit comprising in combination with an electrical generating system including an electrical generator having a field coil connected in series with the current carrying elements of a field coil energizing circuit electrical switching device across a source of energizing voltage and a voltage regulator circuit which operates the current carrying elements of the electrical switching device to the electrical circuit closed and open conditions in response to generator output voltage below and above a predetermined level, respectively; a thermally sensitive fuse element connected in series with said generator field coil and said current carrying elements of said field coil energizing circuit electrical switching device; an electrically energizable heater element in heat transfer relationship with said thermally sensitive fuse element; a voltage divider network including a potentiometer having a movable contact; means for applying the generating system output voltage across said voltage divider network; a first transistor having base, collector and emitter electrodes; a Zener diode; means for connecting said Zener diode in an inverse polarity relationship across said base electrode of said first transistor and said movable contact of said potentiometer; a second transistor having base, collector and emitter electrodes; means for connecting said base and emitter electrodes of said second transistor in series with said collector-emitter electrodes of said first transistor; means for connecting said collector-emitter electrodes of said first transistor and the series combination of said base and emitter electrodes of said second transistor and said collector-emitter electrodes of said first transistor across a source of direct current voltage; and means for connecting said emitter-collector electrodes of said second transistor, said heater element, said thermally sensitive fuse element and said current carrying elements of said field coil energizing circuit electrical switching device in series across a source of direct current voltage.

4. An electrical generating system overvoltage protection circuit comprising in combination with an electrical generator having a field coil, a rectifier circuit having input and output circuitry for rectifying the generator output voltage, an electrical switching device having current carrying elements connected in series with the field coil across the output circuitry of the rectifier circuit and a voltage regulator circuit which operates the current carrying elements of the electrical switching device to the electrical circuit closed and open conditions in response to generator output voltage below and above a predetermined level, respectively; a thermally sensitive fuse element connected in series with said generator field coil and said current carrying elements of said field coil energizing circuit electrical switching device; an electrically energizable heater element in heat transfer relationship with said thermally sensitive fuse element; a voltage divider network including a potentiometer having a movable contact; means for connecting said voltage divider network across said output circuitry of said rectifier circuit; a first transistor having base, collector and emitter electrodes; a Zener diode; means for connecting said Zener diode in an inverse polarity relationship across said base electrode of said first transistor and said movable contact of said potentiometer; a second transistor having base, collector and emitter electrodes; means for connecting said emitter-base electrodes of said second transistor in series with said collector-emitter electrodes of said first transistor; means for connecting said collector-emitter electrodes of said first transistor and the series combination of said emitter-base electrodes of said second transistor and said collector-emitter electrodes of said first transistor across a source of direct current voltage; and means for connecting said emitter-collector electrodes of said second transistor, said heater element, said thermally sensitive fuse element and said current carrying electrodes of said field coil energizing circuit electrical switching device in series across a source of direct current voltage.

5. An electrical generating system overvoltage protection circuit comprising in combination with an electrical generator having a field coil, a rectifier circuit having input and output circuitry for rectifying the generator output voltage, an electrical switching device having current carrying elements connected in series with the field coil across the output circuitry of the rectifier circuit and a voltage regulator circuit which operates the current carrying elements of the electrical switching device to the electrical circuit closed and open conditions in response to generator output voltage below and above a predetermined level, respectively; a thermally sensitive fuse element connected in series with said generator field coil and said current carrying elements of said field coil energizing circuit electrical switching device; an electrically energizable heater element in heat transfer relationship with said thermally sensitive fuse element; a voltage divider network including a potentiometer having a movable contact; means for connecting said voltage divider network across said output circuitry of said rectifier circuit; an NPN transistor having base, collector and emitter electrodes; a Zener diode; means for connecting said Zener diode in an inverse polarity relationship across said base electrode of said NPN transistor and said movable contact of said potentiometer; a PNP transistor having base, collector and emitter electrodes; means for connecting said emitter-base electrodes of said PNP transistor in series with said collector-emitter electrodes of said NPN transistor; means for connecting said collector-emitter electrodes of said first transistor and the series combination of said emitter-base electrodes of said second transistor and said collector-emitter electrodes of said first transistor across said output circuitry of said rectifier circuit; and means for connecting said emittercollector electrodes of said second transistor, said heater element, said thermally sensitive fuse element and said current carrying electrodes of said field coil energizing circuit electrical switching device in series across said output circuitry of said rectifier circuit.

\* \* \* \* \*